Aug. 5, 1952     D. L. R. LESCANO     2,605,549
PRECISION MEASURING INSTRUMENT
Filed May 5, 1948
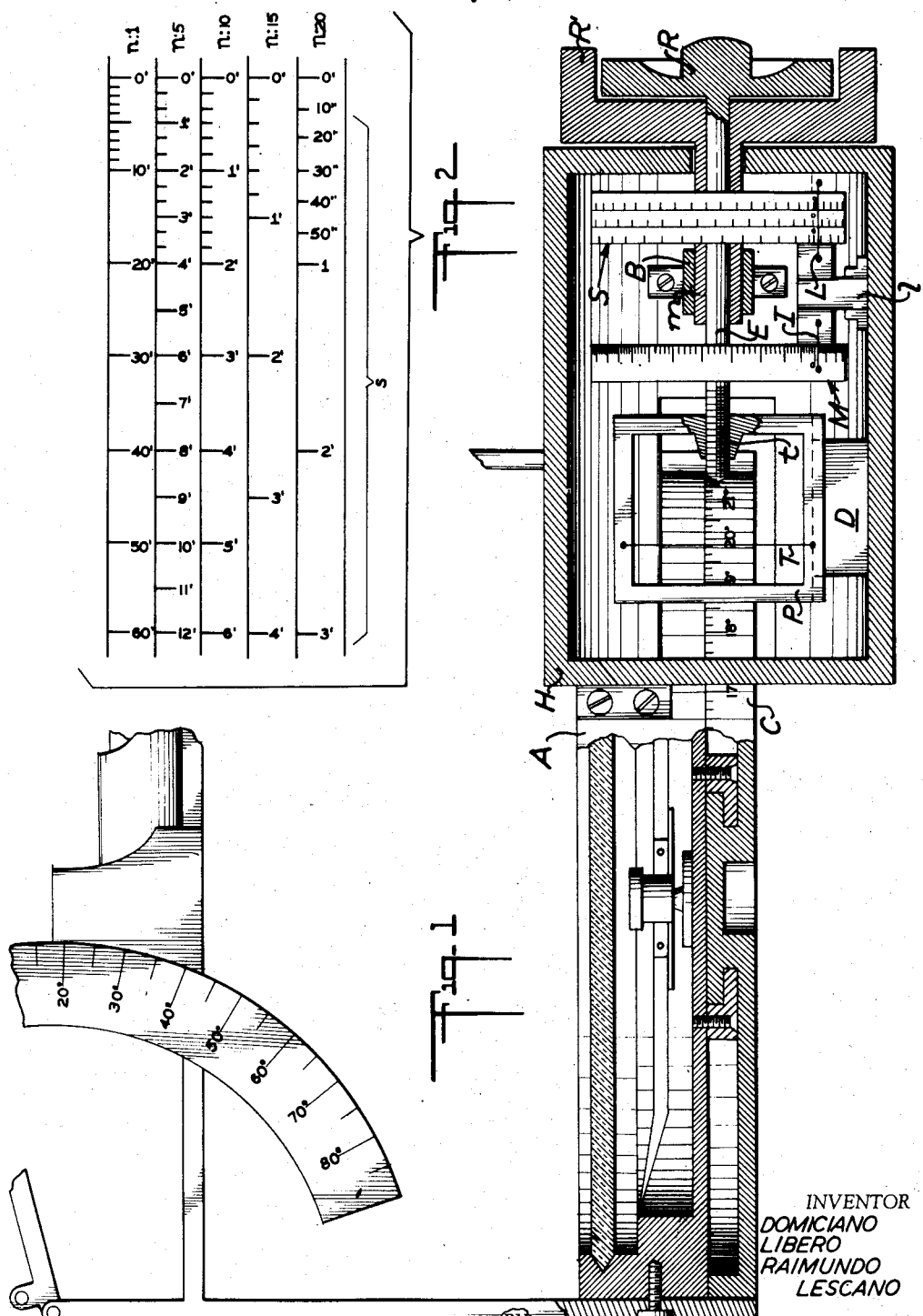
INVENTOR
*DOMICIANO
LIBERO
RAIMUNDO
LESCANO*
BY
ATTORNEYS Patented Aug. 5, 1952

2,605,549

UNITED STATES PATENT OFFICE 2,605,549

PRECISION MEASURING INSTRUMENT

Domiciano Libero Raimundo Lescano, Cordoba, Argentina

Application May 5, 1948, Serial No. 25,136
In Switzerland April 22, 1947

3 Claims. (Cl. 33—72)

In certain branches of science where accurate results are only obtainable by a high degree of accuracy in measurement, the precision attained in the construction of the necessary instruments is not sufficient to produce the desired accuracy of measurement in one single observation, owing to the inevitable errors which occur in each observation.

To reduce such errors the measurings are repeated a certain number of times, extracting from the results thus obtained average figures, which correspond more or less to the actual magnitudes.

According to the theory of errors, provided that the results of each measuring are of like accuracy, these average figures correspond to the arithmetical average.

In the case of such observations where each measuring has to be repeated a number of times (5, 10, 15 etc.), as occurs in the measuring of angles in geodetic and topographical surveys, this new system, applied to a theodolite will be of great value as, acting repeatedly on the same mark it permits the direct and final reading of the arithmetical average figure corresponding to the series of readings taken.

The new system as applied to a theodolite departs from the usual practice and may be described as follows:

When measuring an angle by the usual method of repetition, from a 0 station, for example, the usual procedure is as follows:

The apparatus is set at 0 (0°0 min. and 0 sec.) and is focussed on a mark which we will call A. Then, leaving the horizontal circle unmoved the ocular tube is turned until it points to another mark B (at the right of A). As is known in the art, this movement of the ocular tube can be read by means of the corresponding devices which are always affixed to the alidade. After focussing on the mark B the alidade is fixed relative to the circle by means of the corresponding pressure screw and, instead of noting the corresponding reading of the angle, this time the screw of the horizontal circle is loosened, which permits moving the assembly of circle-alidade, and at the same time maintaining the movement previously obtained. Then the mark A is again viewed, the horizontal circle is tightened and the alidade loosened, moving the ocular tube independently of the circle, which remains fixed in its last position and again the mark B is viewed, after which the alidade is immediately adjusted tightly to the circle. This operation is repeated "$n$" times, at the completion of which, the figure of the angle is the result obtained by dividing the final reading by "$n$."

The foregoing refers to one single position of the ocular tube, it being necessary to measure the other positions of same and draw an average from the results so as to compensate for instrumental errors.

The new repeating theodolite permits a repetition of all the results corresponding to the mark A in one reading and then to proceed to those corresponding to mark B. This is very advantageous as regards time, as it is only necessary to get the mark once within the range of the ocular tube without moving it from one mark to the other, which in fact represents the greater part of the time used in measuring with an ordinary theodolite. And this property constitutes the characteristic features of the new theodolite. Furthermore by means of the simple recourse of providing other additional figures on the reading scale which correspond to the quotients by the number of repetitions, the instrument is rendered capable of directly giving the average figure corresponding to "$n$." This innovation in such instruments has been achieved by the following means:

The new and improved micrometer, when applied to a theodolite or the like, is of special advantage and utility in those cases where measurements have to be repeated a number of times (5, 10, 15, etc.) such as are necessary in geodetic and topographic observations, as by means of same a direct, final reading can be taken which gives the arithmetical average of the whole series of measurements made.

(The common micrometer consists of a mechanism for accurately measuring the movement of an indicator or scale and does not show the average of two or more readings or measurements.)

The drawings shows in Figure 1 a longitudinal sectional view of the micrometer and associated parts, and Fig. 2 is a diagram.

In the drawing Fig. 1 shows the principle upon which applicant's new micrometer is based, which in the present instance is to be applied to an ordinary theodolite, as for instance shown, for example, in Patent No. 712,869, issued November 4, 1902.

The micrometer device includes a housing H which is secured to the alidade member A of the theodolite. The scale-reading index T is carried in a frame or slide P, the movement of which is controlled by guide means D fixed to the housing and by the screw $t$, which passes through a female thread provided in the frame P and regulates the movement of said frame P and thereby also regulates the position of the indicator T carried by said frame P and movable horizontally along the scale C which represents the circular rim scale of a theodolite in this instance. The screw $t$ is provided on a shaft E which extends from the frame P to a knob R to which it is firmly fixed.

A drum M carrying a mark 0 is rigidly fixed on the shaft E, and this zero mark indicates the zero position of the index T, the frame of which is at zero when in contact with the casing of the micrometer.

The shaft E is supported and held in frictional engagement by a hollow axle $m$ inside of which the shaft E is able to turn against a predetermined frictional resistance, as for instance, a tight bearing.

The hollow axle $m$ carries the marking scales S on a drum which is rigidly attached to said hollow axle $m$ and which can only rotate together with said hollow axle $m$, which latter has a supporting bearing B in which it can turn against a predetermined frictional resistance, as for instance, a tight bearing, when manipulated by the knob R' into which the end of said hollow axle $m$ is firmly secured.

The scale drum S carries an adequate and convenient number of scales, the index for reading the scales being shown at L which is fixed to the casing of the micrometer as shown at $l$.

The graduations on the first or left-hand scale of S indicate the movement of the index T, the readings of the remaining scales corresponding to the quotients of the former readings divided by 5, 10, 15, 20, etc., according to the calibrations on the respective scale.

The freedom of rotary movement between the shaft E and the hollow axle $m$ is governed by a regulated degree of friction in the sleeve or axle $m$ and the freedom of movement between the hollow axle $m$ in the bearing B is also governed by a predetermined degree of friction by suitable adjustment in the bearing, this latter being greater than the former. Details regarding the manner of regulation of the frictional resistance are not shown as any conventional bearing with soft sleeves or shims may be utilized.

It will be evident from the above explanation that if the knob R' is turned, the hollow axle $m$ and the shaft E both turn together, due to frictional contact, thereby rotating the scale drum S and the drum M and thus the screw thread at the end of the shaft E will move the frame P axially relative to the shaft E and thereby shift the index T. However, if the knob R is turned, no movement will be imparted to the hollow shaft $m$, or consequently to the scale drum S, while all the remaining parts, i. e. shaft E, drum M, screw thread $t$, frame P and index T will move and change positions.

The process of obtaining a field measurement is as follows:

Both drums M and S are set at zero, i. e. are turned until the indexes I and L point to zero when the predetermined mark is visible in the line of sight of the theodolite.

1. Knob R' is now turned until index T coincides with the nearest engraved line of the horizontal scale C.

2. Knob R is now turned until drum M is again at zero.

3. The alidade is now displaced and a fresh fix is taken on the same mark to compensate for error in the first reading.

The above series of operations 1, 2 and 3, are repeated "$n$" times and the final result can be read on that scale of drum S which corresponds to the number of repetitions made. This final direct reading gives the arithmetical average of the "$n$" observations taken.

It must be borne in mind that by the time the final reading is taken, the drum S may have made one or more complete revolutions, whereby the final reading would omit the number of whole minutes equal to that into which the circumference of the calibrated drum is divided and for which a correction has to be made.

*Example*

Having taken a fix on a mark 20 times and the drum S having made 8 complete revolutions and a fraction, the final reading being 2′29″34; assuming that a complete revolution of the drum S is equal to three minutes, then;

$$3 \times 8 = 24'$$
$$+ \ 2'29''34$$
$$= 26'29''34$$

The fundamental characteristic of the invention consists in the fact that the drum S. carrying the scale is arranged to remain stationary while the index T is returned to its original position under the control of the drum M carrying the zero point under the index I, the micrometer then being in condition for a repetition of the operation.

It will be evident from the above explanation that the drum S undergoes a total displacement equal to the sum of all the individual displacements made by the repeated operations and that, therefore, if the final reading of the scale on drum S be divided by "$n$" which is the number of readings taken, the result obtained must be the average displacement of the whole series of readings taken.

Furthermore, it will be evident that if the final reading be made on the particular secondary scale of drum S which corresponds to the number of readings made in the series it will be possible to read off the average displacement directly, as the division by "$n$" is already made in the calibration of that particular secondary scale.

Fig. 2 shows a schematic form of scales with the principal scale at the top and the secondary scales beneath, as distributed around the circumference of drum S with the secondary scales corresponding to the quotients of 5, 10, 15 and 20 readings respectively.

The new and improved micrometer, when applied to a theodolite or the like, is of special advantage and utility in those cases where measurements have to be repeated a number of times (5, 10, 15, etc.) such as are necessary in geodetic and topographic observations, as by means of same a direct, final reading can be taken which gives the arithmetical average of the whole series of measurements made.

(The common micrometer consists of a mechanism for accurately measuring the movement of an indicator or scale and does not show the average of two or more readings or measurements.)

In the drawing attached, Fig. 1 shows the principle upon which applicant's new micrometer is based, which in the present instance is to be applied to an ordinary theodolite.

The scale-reading index T is carried in a frame or slide P, the movement of which is controlled by the screw $t$, which passes through a female thread provided in the frame P and regulates the movement of said frame P and thereby also regulates the position of the indicator T carried by said frame P and movable horizontally along the scale C which represents the circular rim scale of a theodolite in this instance. The screw $t$ is provided on a shaft E which extends from the frame P to a knob R to which it is firmly fixed. The frame P is held from rotation by any suitable means such as an abutment D against which the frame is held when sliding laterally upon rotation of the shaft E.

A drum M carrying a mark 0 is rigidly fixed on the shaft E, and this zero mark indicates the zero position of the index T, the frame of which is at zero when in contact with the casing of the micrometer.

The shaft E is supported and held in frictional engagement by a hollow axle $m$ inside of which the shaft E is able to turn against a predetermined frictional resistance, as for instance a tight bearing.

The hollow axle $m$ carries the marking scales S on a drum which is rigidly attached to said hollow axle $m$ and which can only rotate together with said hollow axle $m$, which latter has a supporting bearing B in which it can turn against a predetermined frictional resistance, as for instance a tight bearing, when manipulated by the knob R' into which the end of said hollow axle $m$ is firmly secured.

The scale drum S carries an adequate and convenient number of scales, the index for reading the scales being shown at L which is fixed to the casing of the micrometer as shown at I.

The graduations on the first or left-hand scale of S indicate the movement of the index T, the readings of the remaining scales corresponding to the quotients of the former readings divided by 5, 10, 15, 20 etc., according to the calibrations on the respective scale.

The freedom of rotatory movement between the shaft E and the hollow axle $m$ is governed by a regulated degree of friction in the sleeve or axle $m$ and the freedom of movement between the hollow axle $m$ in the bearing B is also governed by a predetermined degree of friction by suitable adjustment in the bearing, this latter being greater than the former. Details regarding the manner of regulation of the frictional resistance are not shown as any conventional bearing with soft sleeves or shims may be utilized which may be tightened by bolts as is well known.

It will be evident from the above explanation that if the knob R' is turned, the hollow axle $m$ and the shaft E both turn together, due to frictional contact thereby rotating the scale drum S and the drum M and thus the screw thread at the end of the shaft E will move the frame P axially relative to the shaft E and thereby shift the index T. However, if the knob R is turned, no movement will be imparted to the hollow shaft $m$, or, consequently to the scale drum S, while all the remaining parts i. e., shaft E, drum M, screw thread $t$, frame P and index T will move and change positions.

The process of obtaining a field measurement is as follows:

Both drums M and S are set at zero, i. e. are turned until the indexes I and L point to zero when the predetermined mark is visible in the reticulated eye-piece of the theodolite.

1. Knob R' is now turned until index T coincides with the nearest engraved line of the horizontal scale C.

2. Knob R is now turned until drum M is again at zero.

3. The eye-piece is now displaced and a fresh fix is taken on the same mark to compensate for error in the first reading.

The above series of operations (1), (2) and (3) are repeated "$n$" times and the final result can be read on that scale of drum S which corresponds to the number of repetitions made. This final direct reading gives the arithmetical average of the "$n$" observations taken.

It must be borne in mind that, by the time the final reading is taken, the drum S may have made one or more complete revolutions, whereby the final reading would omit the number of whole minutes equal to that into which the circumference of the calibrated drum is divided and for which a correction has therefore to be made.

*Example*

Having taken a fix on a mark 20 times and the drum S having made 8 complete revolutions and a fraction, the final reading being 2'29''34; assuming that a complete revolution of the drum S is equal to 3 minutes, then $$3\times 8 = 24'$$
$$+\ 2'29''34$$
$$= 26'29''34$$

The fundamental characteristic of the invention consists in the fact that the drum S, carrying the scale, is arranged to remain stationary while the index T is returned to its original position under the control of the drum M carrying the zero point under the index I, the micrometer then being in condition for a repetition of the operation.

It will be evident from the above explanation that the drum S undergoes a total displacement equal to the sum of all the individual displacements made by the repeated operations and that, therefore, if the final reading of the scale on drum S be divided by "$n$," which is the number of readings taken, the result obtained must be the average displacement of the whole series of readings taken.

It will furthermore be evident that, if the final reading be made on the particular secondary scale of drum S which corresponds to the number of readings made in the series it will be possible to read off the average displacement directly, as the division by "$n$" is already made in the calibration of that particular secondary scale.

Fig. 2 shows a schematic form of scales with the principal scale at the top and the secondary scales beneath, as distributed around the circumference of drum S with the secondary scales corresponding to the quotients of 5, 10, 15 and 20 readings respectively.

Having thus described my invention both in theory and practice, I claim:

1. A precision measuring instrument comprising a rotatable shaft one end of which carries a screw thread, an element carrying a zero mark fixed on said shaft, a movable frame engaging said threaded end of said shaft and carrying an index thereon, means engaging the frame to prevent rotation thereof but permitting movement parallel to the axis of the shaft upon rotation of the latter, a hollow axle which carries a dial in the form of a plurality of coaxial circular scales thereon and a knob, said axle mounted on and holding said shaft in frictional engagement, a second independently rotatable knob to actuate the shaft, an index for the element on the shaft and the circular scales, and a bearing for said shaft and hollow axle for concentrically supporting the shaft and axle with frictional resistance, the frictional resistance between said shaft and said hollow axle being less than that between said hollow axle and said bearing whereby manipulation of the hollow axle knob also turns the said shaft, but manipulation of the shaft knob turns only the said shaft with the hollow axle remaining stationary.

2. In combination with a scale of a theodolite and a member whose position is to be determined relative to said scale a precision measuring instrument comprising a rotatable shaft one end of which carries a screw thread, an element carrying a zero mark fixed on said shaft, a movable frame on the threaded end of said shaft being operatively engaged thereby, said frame carryin gan index thereon in position for observation relative to said scale, means engaging the frame to prevent rotation thereof but permitting movement parallel to the axis of the shaft upon rotation of the latter, a hollow axle mounted on said shaft in frictional engagement therewith, a dial mounted on the hollow axle and having a plurality of calibrated scales thereon, a knob for the axle, a separate and independent knob secured to and to actuate the shaft, an index for the element on the shaft and the circular scales, and a bearing mounted on said member for supporting the hollow axle and therewith the concentrically supported shaft with frictional resistance between said shaft and said hollow axle which is less than the frictional resistance between said hollow axle and said bearing whereby rotation of the hollow axle knob also turns the said shaft and manipulation of the shaft knob turns only the said shaft with the hollow axle remaining stationary, said index carried by the said frame moved and controlled by the screw threaded end of said shaft being the means for measuring the reading on said theodolite.

3. A precision measuring instrument comprising a rotatable shaft one end of which carries a screw thread, a drum carrying a zero mark fixed on the shaft, a movable frame carrying an index thereon, means engaging the frame to prevent rotation thereof but permitting movement parallel to the axis of the shaft upon rotation of the latter, a hollow axle mounted on the shaft, said shaft being held in frictional engagement by the hollow axle, a dial mounted on the hollow axle and having a plurality of calibrated scales thereon, a knob for the hollow axle, a separate and independent knob for the shaft, an index for the zero mark on the drum and the circular scales, and a bearing for the hollow axle to concentrically support the shaft and axle with frictional resistance between said shaft and said hollow axle which is less than the frictional resistance between said hollow axle and said bearing whereby rotation of the hollow axle knob also turns the said shaft but rotation of the shaft knob turns only the said shaft with the hollow axle remaining stationary, the scales carried on the said revolving hollow axle being a multiple scale consisting of one principal scale and a plurality of secondary scales, and the calibrations on said secondary scales being arranged to give the quotients of the reading of the said principal scale corresponding to selected numbers of readings.

DOMICIANO LIBERO RAIMUNDO
LESCANO.

REFERENCES CITED

The following references are of record in the file of this patent:

UNITED STATES PATENTS

| Number | Name | Date |
|---|---|---|
| Re. 22,184 | Everitt | Sept. 29, 1942 |
| 1,765,697 | Palmer et al. | June 24, 1930 |
| 1,777,853 | Mahler | Oct. 7, 1930 |
| 2,162,767 | Thurlow | June 20, 1939 |
| 2,252,341 | Everitt | Aug. 12, 1941 |